Figure 1:
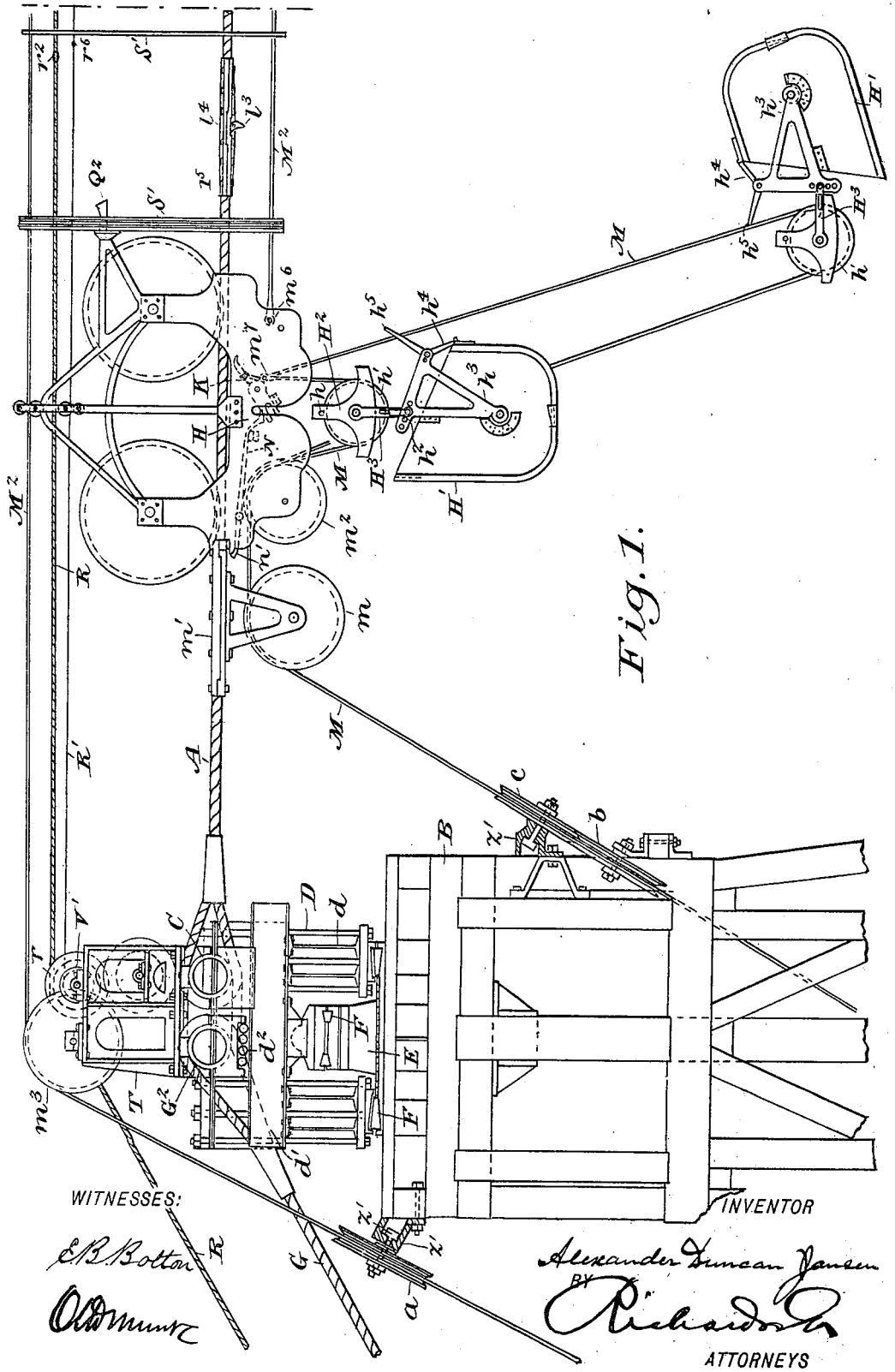

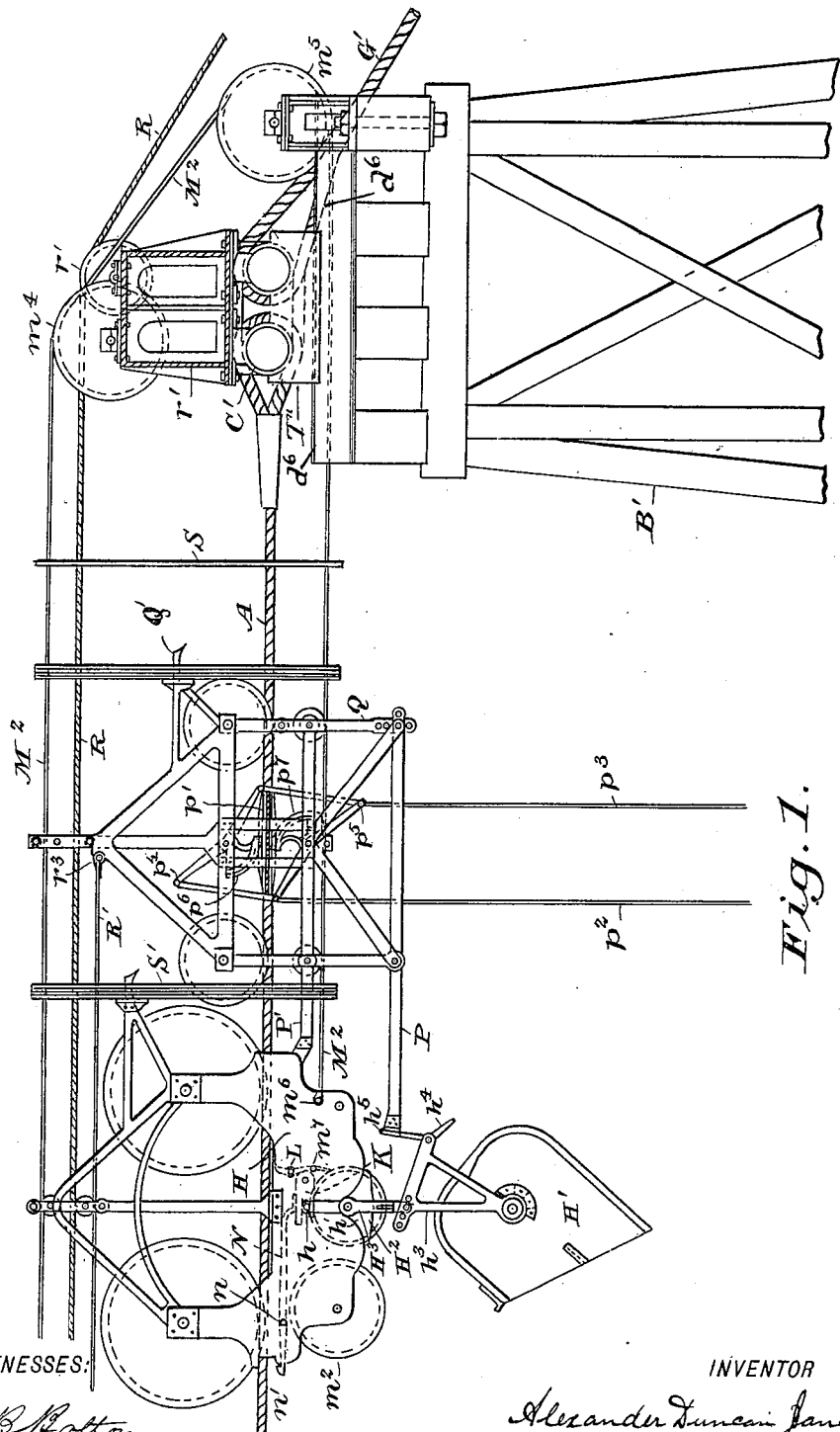

No. 670,155.

A. D. JANSEN.
CONVEYER.
(Application filed July 5, 1899.)

Patented Mar. 19, 1901.

(No Model.)

10 Sheets—Sheet 2.

WITNESSES:

INVENTOR
Alexander Duncan Jansen
BY
Richardson
ATTORNEYS

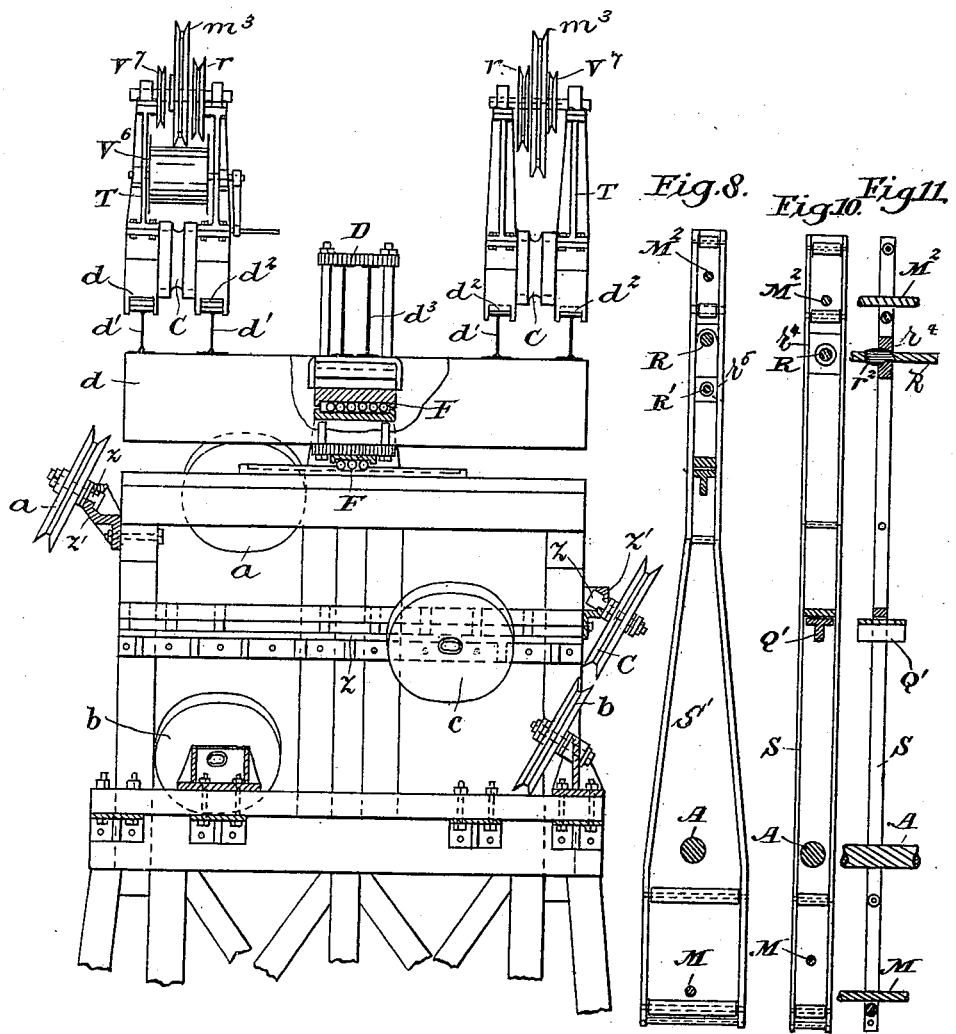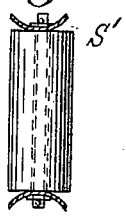

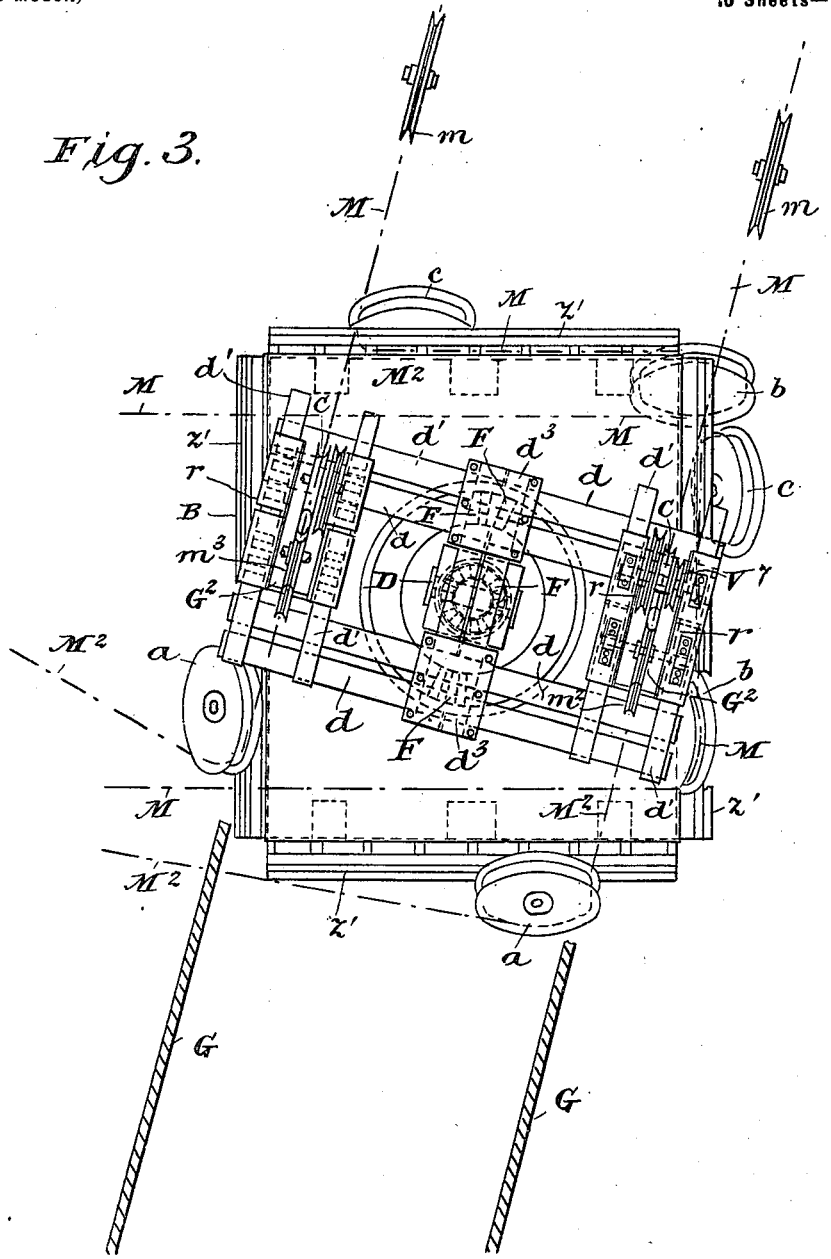

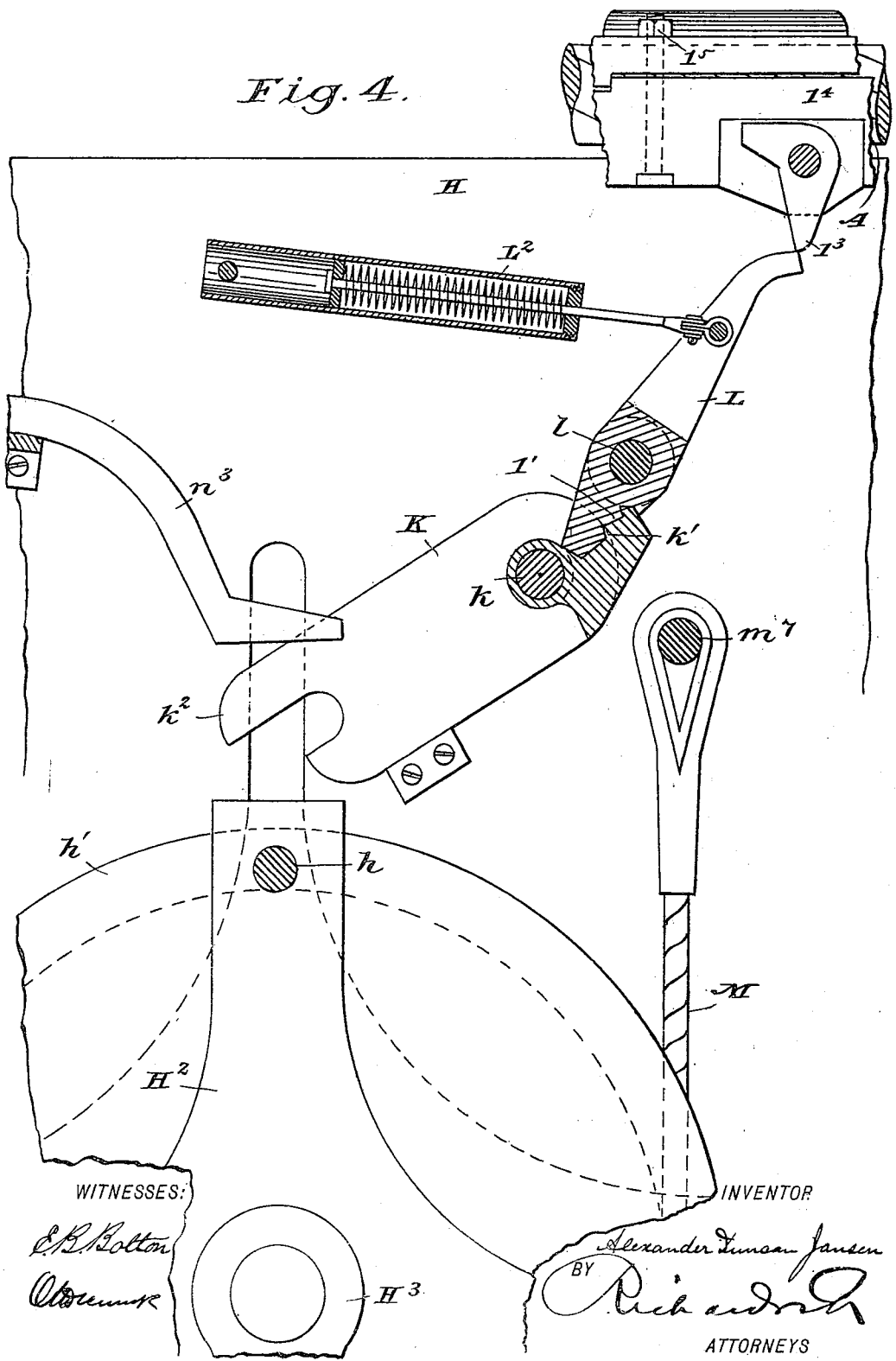

No. 670,155. Patented Mar. 19, 1901.
A. D. JANSEN.
CONVEYER.
(Application filed July 5, 1899.)
(No Model.) 10 Sheets—Sheet 6.
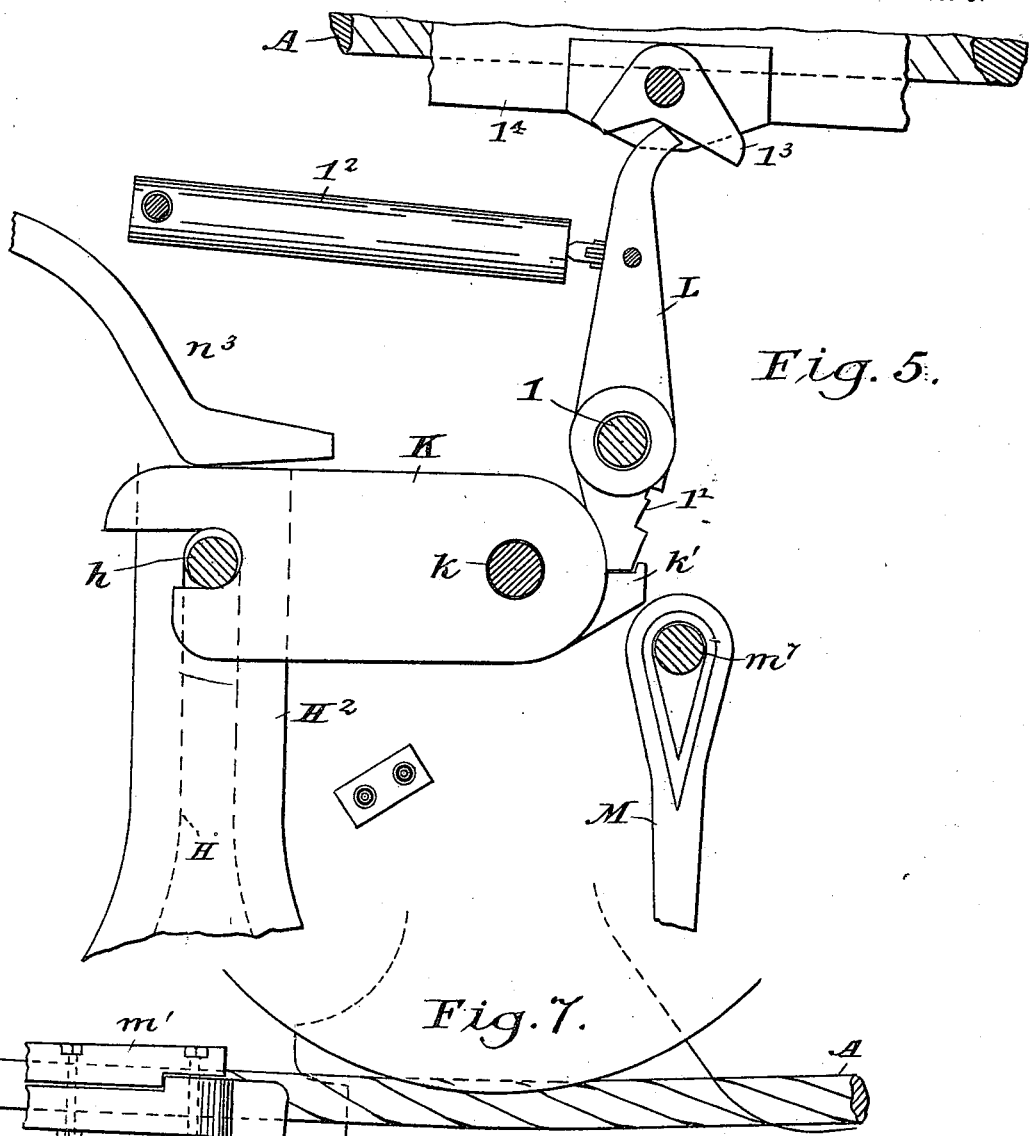
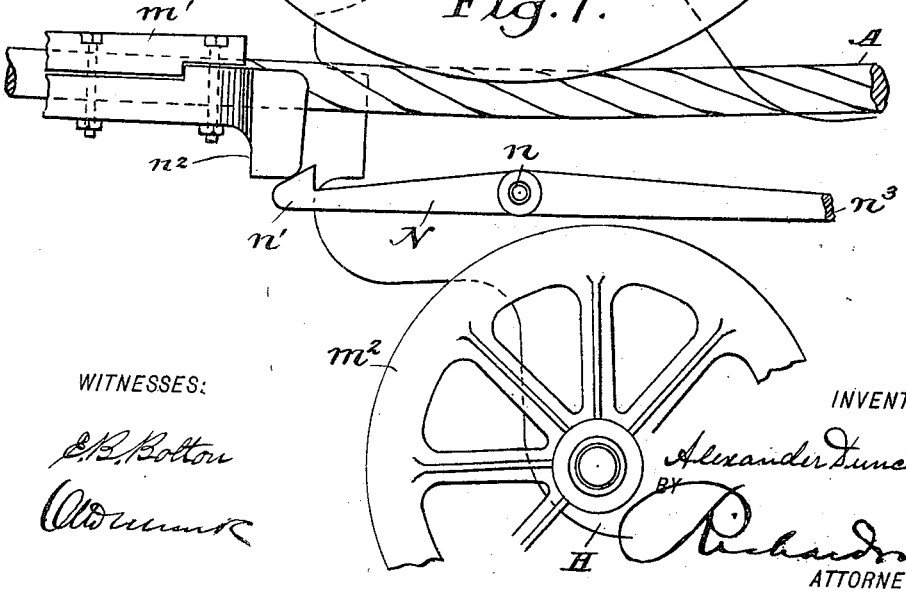
WITNESSES: INVENTOR
Alexander Duncan Jansen
BY
ATTORNEYS
THE NORRIS PETERS CO., PHOTO-LITHO., WASHINGTON, D. C.

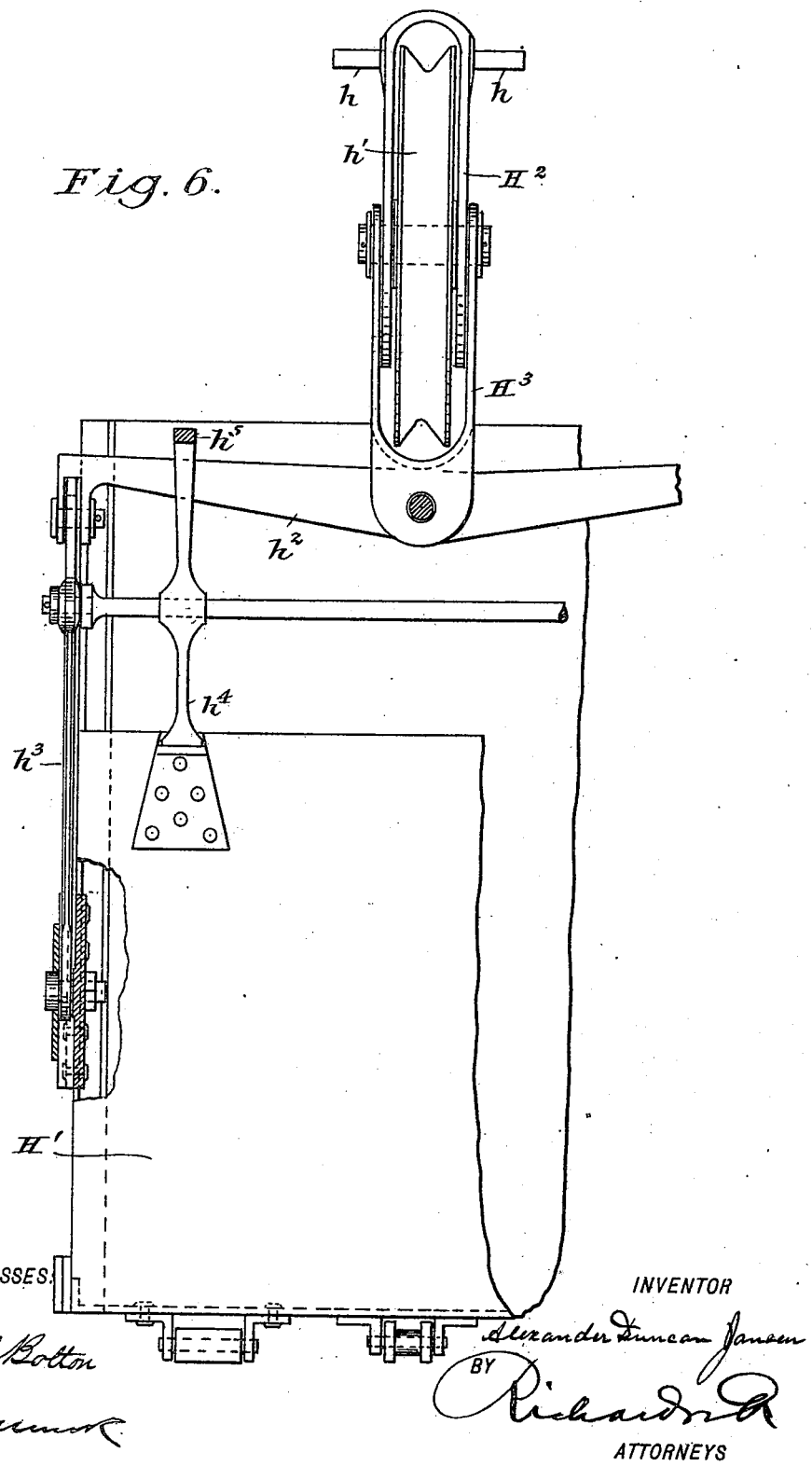

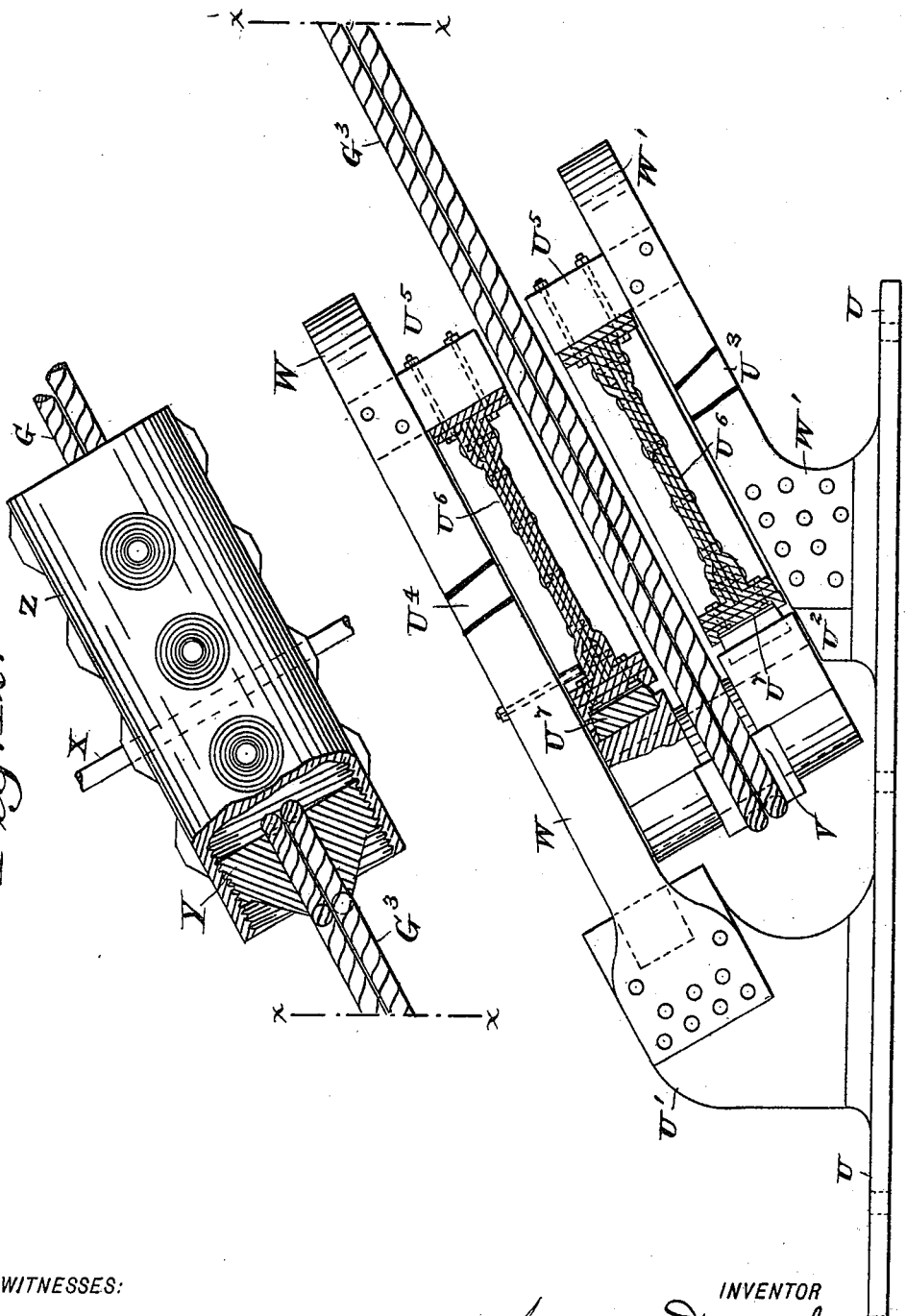

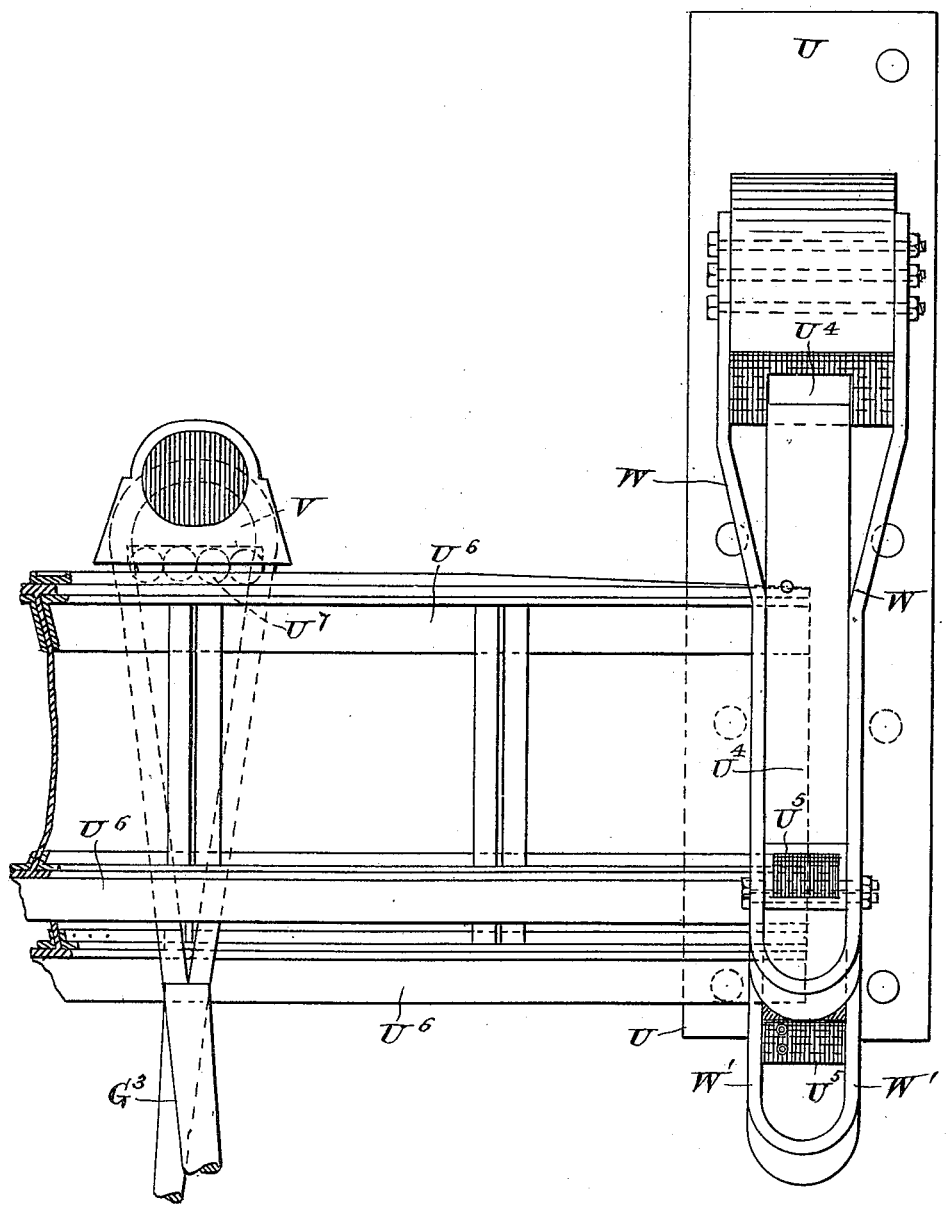

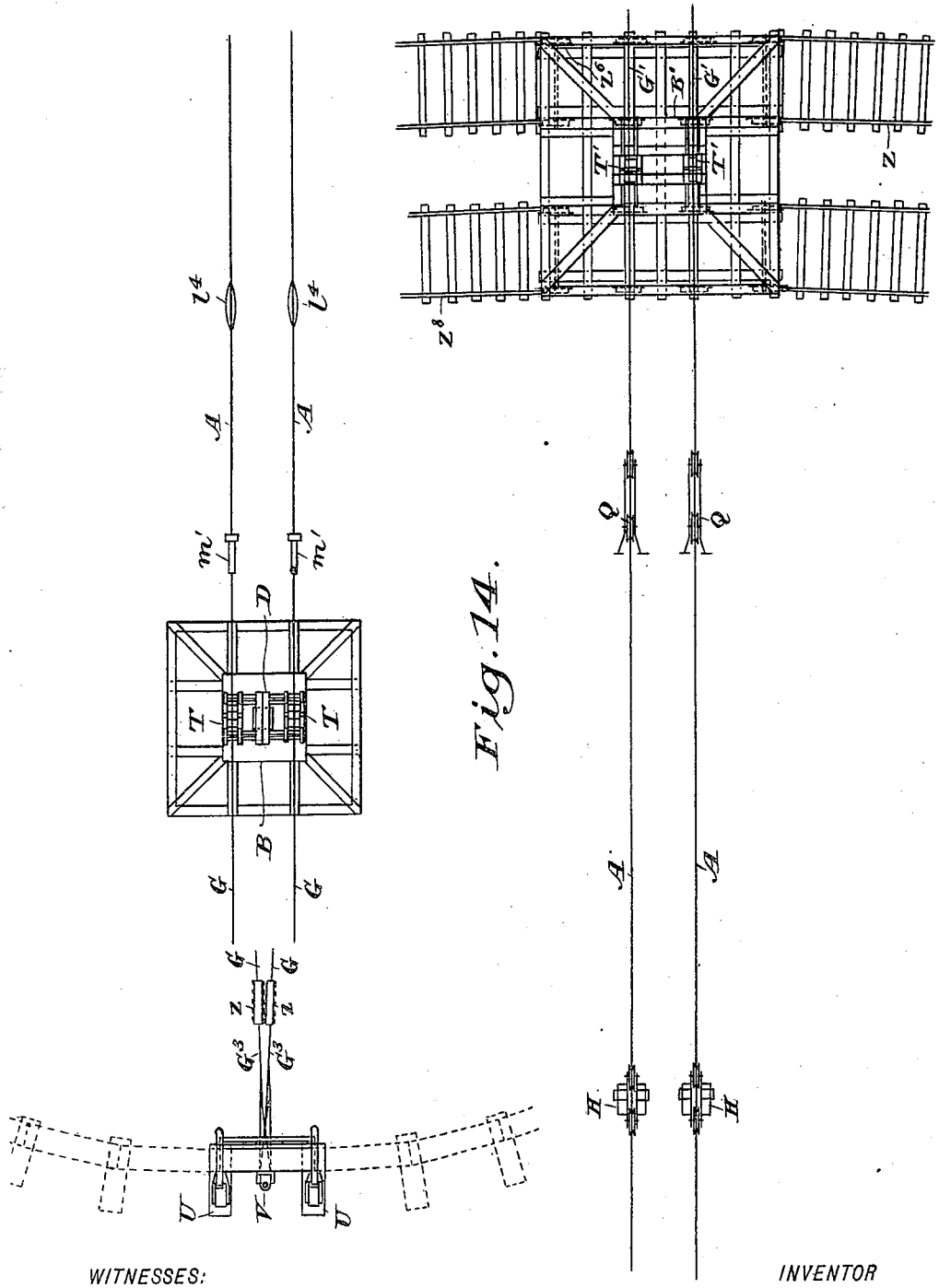

UNITED STATES PATENT OFFICE.

ALEXANDER DUNCAN JANSEN, OF JOHANNESBURG, SOUTH AFRICAN REPUBLIC.

CONVEYER.

SPECIFICATION forming part of Letters Patent No. 670,155, dated March 19, 1901.

Application filed July 5, 1899. Serial No. 722,902. (No model.)

*To all whom it may concern:*

Be it known that I, ALEXANDER DUNCAN JANSEN, a subject of the Queen of Great Britain and Ireland, and a resident in Royal Chambers, Simmonds street, Johannesburg, in the South African Republic, have invented a certain new and useful Improved Conveyer, of which the following is a specification.

This invention relates to an improved conveyer and is designed with the object of providing an apparatus which will perform in regular rotation the various functions of, first, filling, second, transporting, and third, depositing on the dumping-site with a minimum of labor and consequent saving in cost.

My invention will be fully described with reference to the accompanying drawings, in which—

Figure 1, Sheets 1 and 2, shows a general view; Fig. 2, a front view of one of the head-gears with turn-table; Fig. 3, a plan view of said head-gear, showing turn-table; Fig. 4, a detailed view of automatic clutch for securing bucket to the carriage, showing position of clutch when open; Fig. 5, a detailed view of automatic clutch for securing bucket to the carriage, showing position of clutch when closed; Fig. 6, a half-back elevation of bucket and method of attachment; Fig. 7, a detailed view of device for locking the conveyer-car to the ropeway while the bucket descends; Fig. 8, an enlarged view of movable supports S'; Fig. 9, a cross-section of S', showing roller enlarged; Fig. 10, an enlarged view of movable support S; Fig. 11, a vertical section of S; Fig. 12, a side elevation of a form of anchor which may be employed; Fig. 13, a top plan of a form of anchor which may be employed, and Fig. 14 a general plan view of the conveyer.

B B' are two head-gears preferably mounted upon trolleys running on rails, so that they may be conveniently moved as desired. On head-gear B, D is a turn-table supported by the central column E, which is firmly secured to the head-gear B, F F being cones or roller-bearings to facilitate turning.

A is a steel-wire rope stretched between the two head-gears B B' and secured thereto by means of the pins C C', passing through the loops, as shown.

Two ropes are employed between each head-gear, as will be apparent on referring to Fig. 2, where the disposition of the fastening-pins C C is shown. Only one ropeway appears in Fig. 1 with arrangement of cars, &c., as hereinafter described, which arrangement, however, applies equally to the other ropeway, both being identical.

G G' are anchor-ropes secured to anchors in the ground, as hereinafter described, for the purpose of taking up the strain caused by the tightening of the main cable A.

H H represent the car, consisting of two grooved wheels, as shown, constructed to run along the main ropeway A, the framework of the car depending from the ropeway, as shown.

H' is a bucket, an enlarged view of the method of attachment of which to the car H is shown in Fig. 6, $H^2$ being a framework provided with studs $h$, within which framework runs the grooved sheave $h'$. From the center of this framework $H^2$ is hung the framework $H^3$, the lower end of which is pivoted to the cross-bar $h^2$. At each end of this cross-bar $h^2$ is attached the frame $h^3$, between which the bucket H' swings.

In Fig. 1 the car H, with bucket H', is shown in two positions, that toward the left showing the bucket H' disconnected from the car H and supported by the rope M, (the disposition of which is hereinafter described,) while that view toward the right shows the bucket H' locked to the car H. The bucket H' is locked to the framework of the car H by means of a movable bolt K, an enlarged view of which is shown in Figs. 4 and 5, Fig. 4 showing the bolt unlocked and having released the framework $H^2$, carrying the bucket H', and Fig. 5 a view showing the bolt locked with the framework $H^2$ in position. The bolt K is pivoted at $k$ to the framework H of the car and is recessed at $k'$ and forked at $k^2$, as shown. L is a bolt pivoted at $l$ to the framework H of the car and recessed at $l'$ to correspond with the recess at $k'$. These two portions $k'$ and $l'$ are so fitted that when in the position relatively to one another as shown in Fig. 5 $k$ is unable to be depressed until such time as $l$ is moved backward—*i. e.*, to the right. $L^2$ is a coiled or other tension spring for the purpose of drawing the bolt L inward. $l^3$ is an elbow-catch pivoted to the under side of the clamp $l^4$, which is constructed in two halves, as shown, so that on tightening the bolts $l^5$ the clamp $l^4$ may be fixed on the main ropeway A at any desired point. When the car H is traveling along the ropeway A from right to left, the elbow-catch $l^3$ is engaged by the bolt L, as shown in Fig. 4, pressing it backward against the tension of the spring $l^2$. This forcing back of L disengages the clutching between K' and $l'$, which causes K to fall, and thus frees the bucket, owing to the studs $h$ dropping out of the forked end $k^2$ of the bolt K. The weight of the bucket H' is then taken up by the hauling-rope M, which passes from the winding-engine (not shown in the drawings, as any form of winding-engine may be employed) over a pulley $m$, attached to a clamp $m'$, carried on the main ropeway A, over the pulley $m^2$, which is secured to the body of the framework of the car H, and under the pulley or sheave $h'$, which, as already described, forms part of the framework $H^2$, which carries the bucket H', the end of the rope M being then secured to the body of the car H by the pin $m^7$, as shown in Figs. 1, 4, and 5.

The pulley $m^2$, attached to the car H, is shown enlarged in Fig. 7, where is also shown the method of locking the car H to keep it stationary while the filling and hauling operations of the bucket H' are in progress. This is accomplished automatically by the lever N, pivoted at $n$ to the framework of the car H and provided at its outer end with a catch $n'$, which locks into a suitable recess $n^2$, formed in the end of the clamp $m'$, the other end $n^3$ of the said lever N being continued until it is immediately over the bolt K, as shown in Figs. 1, 4, and 5. When the bolt K is up, therefore, Fig. 5, and the framework $H^2$ locked to the car H, the catch N' is depressed; but directly the bucket H' is unlocked from the car H in order to descend the catch $n'$ is raised by gravity and automatically locks itself into the recess $n^2$, formed in the clamp $m'$, as the car H comes to the end of its journey. The bucket H' is now, as already stated, entirely independent of the car H, being suspended from it by means of the rope M. On unwinding the rope M, therefore, the bucket H' will descend, so as to receive its load, after which on rewinding the rope M the bucket H' will be hauled up until the projections $h$ enter the fork $K^2$ and force it up until the bolts K and L are in the position shown in Fig. 5, when the bucket H' is securely locked to the car H, ready for the outward journey, and at the same time the rewinding causes the framework $H^2$ to come into contact with the under face of the foot $n^3$ and force it upward. The other end $n'$ of the lever N is consequently depressed and the car is free to move; but directly the bucket is unlocked from the car H in order to descend the framework $H^2$ descends also and leaves the foot $n^3$ free to fall of its own weight. The other end $n'$ of the lever N is consequently raised, and on the arrival of the car at $m'$ the end $n'$ automatically locks itself into the recess $n^2$, formed in the clamp $m'$. $M^2$ is a hauling-rope passing from the winding-engine over the pulley $m^3$, fixed to the movable frame T of the turn-table D on the head-gear B, and around the pulleys $m^4$, fixed to the movable frame T' on the head-gear B', and over $m^5$, fixed to the head-gear B', and thence back to the car H, where it is secured, as at $m^6$. On hauling on rope $M^2$, therefore, the car H is drawn outward toward head-gear B' and in the opposite direction by hauling on rope M. As the car is being hauled outward—i. e., from left to right—the bolt L, coming into contact with the elbow-catch $l^3$, makes that catch revolve, and thus gives room for the bolt L to pass. (See Fig. 5.)

The bucket H' is automatically caused to overturn and dump itself at any desired point along the ropeway A by means of the following device:

The framework $h^3$, carrying the bucket H', is provided with a catch $h^4$, having a projecting arm $h^5$, as shown.

P is a stop fixed to the framework of another car or trolley Q, which may be secured at any desired point on the ropeway by means of a clamp $p'$, operated through the ropes $p^2 p^3$, attached to the levers $p^4 p^5$, to which the cams $p^6 p^7$ are fixed. On pulling the rope $p^2$ the cams $p^6 p^7$ move in opposite directions and loosen the clamp $p'$, thus allowing the car Q to be hauled along the main ropeway A to any desired position, where it may be fixed by pulling the rope $p^3$, which action causes the cams $p^6 p^7$ to move and clamp $p'$ onto the rope A. The stop P is arranged so that its end projects so as to strike the projecting arm $h^5$ of the catch $h^4$, thereby releasing the catch $h^4$ from the bucket and allowing the bucket H' to overturn of its own weight, as shown in Fig. 1. When $h^4$ is released, the car H comes up against the stop P', and thus the strain of any overhauling or shock is communicated to the main body of the car Q.

The bucket H' is of that class of buckets known as "self-dumping" and "self-righting"—i. e., it is so constructed that its center of gravity is below the point where it is pivoted when upright and empty; but when full its center of gravity is at a point above the center on which it swings, so that when the catch $h^4$ is unlocked by coming in contact with the aforesaid stop P the bucket overturns of its own weight and having emptied itself of its load swings back and rights itself. As soon as the car H, beginning its backward journey, leaves the car Q the projecting arm $h^5$ of the catch $h^4$ becomes free, which therefore drops into position and locks the bucket H'.

The hauling-ropes M $M^2$ of the car H may be liable to sag to an undesirable extent in the event of a long ropeway being employed, (say one thousand feet or more,) and I make provision for supporting same by means of movable supports or distance-pieces S S', carried by a supplementary wire rope R, which passes over the pulleys $r$ $r'$ in the head-gears B B', the said rope being secured to anchors in the ground at either end, provided with a suitable arrangement for tightening the same. The anchors and tightening arrangement are not described or shown in the drawings, as they do not constitute any part of the invention, and it is obvious that many different varieties may be employed which will be equally satisfactory, or the rope R may be secured at either end to a small windlass or drum situated in the head-gears B B', as described hereinafter in connection with the button-rope R'.

S S' are the movable supports or distance-pieces, enlarged views of which are shown in Figs. 8, 9, 10, and 11, in which the disposition of the various ropes is clearly shown. The said supports or distance-pieces are in two series, the one indicated in the drawings by the letter S and the other by S', the weight of the stops of both series being borne by the aforementioned rope R. The rope R is provided with a series of knots or buttons $r^2$ at stated intervals to work in conjunction with the series of supports S, each successive knot being larger than its predecessor, the smallest knot or button being nearest the head-gear B'. When the car Q is in such a position on the ropeway A that it is close to head-gear B', all the supports S are collected and carried on the projecting arm Q' of the car Q. In the drawings the car Q is shown moved away from head-gear B' a sufficient distance for the first support to have become engaged by the first knot $r^2$ on the rope R, and it has consequently left its fellows, which still remain on the arm Q'. The next support of the series S becomes engaged by the next knot $r^2$ (which is larger than its predecessor) on the car Q being moved nearer toward head-gear B, and so on until the car Q is quite close to head-gear B on the ropeway A, when all the supports S will have become engaged by their respective knots $r^2$, and thus left at stated intervals along the line of ropeway. The said supports S are constructed of a light framework furnished with rollers, as shown, to decrease friction on the various ropes and with blocks $r^4$, bored with holes of a diameter sufficient to intercept the particular knot on the rope R for which it is intended. The diameter of the hole in the block $r^4$ of every succeeding support is therefore larger than its predecessor, so as to engage each knot $r^2$ in succession. The car H is furnished with a similar projecting arm $Q^2$ and carries the second series of supports S' in a precisely similar manner as in the case of the car Q, which are also provided with blocks $r^5$, bored as aforesaid, so as to be intercepted by the knots $r^6$ on the rope R' as the car H moves toward the head-gear B. The rope R' is secured at one end to the framework of the car Q, as at $r^3$, the other end passing over a loose pulley $V^7$, fixed to the traveling frame T on the top of head-gear B to a small windlass or winding-drum $V^6$, fixed to the traveling frame T on the top of head-gear B, so that whatever may be the position of the car Q upon the ropeway the rope R' may always be kept taut. The said rope R' is also provided with a series of buttons or knots $r^6$ to work in conjunction with the series of supports S' in a precisely similar manner to the rope R, each successive knot being larger than its predecessor, the smallest being nearest the car Q. The supports S' are similar in construction to the series S, but are widened at the base, as shown, for the purpose of allowing them to pass the projecting arm P' and also the wheel of the car Q, and the blocks $r^5$, bored for the respective knots $r^6$, are fixed at a lower point, as the rope R' is lower. As either car moves outward toward the head-gear B' the supports S or S' are collected by the projecting arms Q' $Q^2$, respectively. When the car Q is set on the ropeway A so as to cause the bucket H' to dump close to the head-gear B, all or nearly all of the supports S will be left at their stated intervals along the ropeway A, whereas the whole of the series S' will be supported on the projecting arm $Q^2$. On the other hand, when the car Q is set so as to cause the bucket H' to dump close to head-gear B' all or nearly all of the supports S will be carried upon the projecting arm Q', while those supports of the series S' will be extended along the ropeway R', but supported by the ropeway R, and be picked up one by one as the car H runs toward the dumping-site.

In certain cases—e. g., in the discharge of tailings produced in the reduction of ores from which the gold or valuable products have been extracted—where a wide field of discharge is necessary to meet the requirements of many years it is advisable, as already stated, to mount one head-gear at least on a truck or trolley running on rails. Certain contingencies may arise which make it advisable to mount both head-gears in this manner; but the mounting of the outer head-gear B' on a trolley running on rails laid on a curve of a radius equal to the length of the ropeway and providing the inner head-gear B with a turn-table, as hereinafter described in detail, will in most cases give an amply sufficient dumping-field for all practical purposes, and the latter arrangement will therefore be described with reference to the drawings. The outer head-gear B' is mounted on one or more trucks or trolleys $Z^6$, running on rails $Z^8$, as shown, the inner head-gear B being provided with a turn-table D, supported by roller-bearings, as already described. The said turn-table is constructed of two main girders $d^3$, from which are hung four cross-girders $d$, on the top of which are fixed four runners $d'$, bolted thereto at right angles. The runners $d'$ $d'$ are laid in pairs on opposite sides of the turn-table, as shown in Fig. 2, each pair supporting one of the movable frames T, which carry the pins C $G^2$, the pulleys $m^3$, $r$, and V', and the drum $V^6$, said frames T being recessed at the bottom to receive the rollers $d^2$, so that the frame T may move freely to and fro along the said runners $d'$. The strain of the rope A is therefore taken as directly as is possible by the ropes G, which are anchored to the ground, as hereinafter explained. The head-gear B' is also provided with runners $d^6$, on which the movable frames T' move freely to and fro in an exactly similar manner to the frames T on head-gear B, the difference in construction being that there is no turn-table in head-gear B'.

The anchors referred to are shown in Figs. 12 and 13 and consist of two or more foundation-plates U, which are spaced at intervals along the circumference of the circle of which the head-gear B is the center and firmly secured to concrete or other foundations in the ground, each of the said foundation-plates being provided with raised pieces $U' U^2$. A cast-iron column $U^4$ is secured to the projection $U'$ and is held in position by the strap or plate W. $U^3$ is a similar column secured to the projection $U^2$, being fixed thereto in the same manner by the plate W'. On the inner sides of the columns $U^3 U^4$ are secured two bearing-pieces $U^5 U^5$, projecting inwardly toward one another. These bearing-pieces $U^5$ are also held in position by the straps or plates W W', already referred to, which are bolted on either side of the columns $U^3 U^4$ and through the projections $U' U^2$. Between each pair of these foundation-plates two longitudinal girders or runners $U^6$ are bolted parallel with one another. These girders or runners $U^6 U^6$ are longitudinally bolted to the bearing-pieces $U^5 U^5$, recessed at their lower ends to receive rollers $U^7$. V is a traveling block with a pin around which one end of the rope $G^3$ is secured, the said block V being also recessed to receive the rollers $U^7$. It is clear, therefore, that the block V when the strain is upon the ropes will sit close upon the rollers $U^7$, which are interposed between it and the inner longitudinal girders or runners $U^6$. The object of making the block V move upon rollers in this fashion is so that when the head-gear B' is shifted radially to cover fresh dumping area the backstays or anchor-ropes G may also be shifted to be in a straight line with the main cable A. As a further radius of anchorage in course of time is required, all that is necessary is to form a new foundation and secure another bed-plate U thereto. A second pair of girders $U^6 U^6$ are then bolted at one end to the new bed-plate and at the other to the nearest of the old pair of bed-plates, thus forming a continuation along which the block V may travel. As the distance between the anchorage and the head-gear B is very small compared with the length of the conveyer, it is apparent that a comparatively short length of travel for the block V will give a wide area of discharge. The anchorage of head-gear B' may either be of the same character as that already described or may be in the form of a weighted truck running on rails laid circumferentially parallel to the rails $Z^8$, on which the trolleys of head-gear B' run. This latter form of anchorage may be preferable for the outer head-gear B', owing to the fact that it travels over a much greater area than is the case with head-gear B. This latter construction is not shown on the drawings, as the form of anchorage already described would be quite suitable, but mention is merely made of this alternative form of anchorage for the outer head-gear, as under certain conditions its employment might be more expedient.

The anchor-ropes or backstays G are furnished with a tightening device Z, which consists of a tube threaded on its interior surface, one end being right-handed and the other left-handed. Into each end of this tube a threaded collar is adapted to be received, to which the ropes $G G^3$ are respectively secured. By inserting a lever X through holes in the tube Z the anchor-ropes may be either tightened or loosened, as required.

In Figs. 1, 2, and 3 certain small and independent sheaves or pulleys $a$ $b$ will be observed, the purpose of which is to act as guides for the hauling-ropes $M^2$ and M when the apparatus is turned. The hauling-rope $M^2$ as it leaves the winding-drum passes over a guide-sheave fixed in the engine-house and is not shown in the drawings, and thence over another movable guide-sheave $a$, fixed to head-gear B and shown on drawings Figs. 1, 2, and 3 and which directs it into the sheave $m^3$ on the traveling frame T. The hauling-rope M, leaving the winding-drum, passes over a fixed guide-sheave $b$ to the head-gear B, and thence over a movable guide-sheave $c$, also fixed to the head-gear B, which directs it into the sheave $m$, fixed to the clamping device $m'$. It is impossible to definitely state what would be the most effective manner of disposition of the said guiding-pulleys, as such can only be determined by noting the tendency of the ropes in actual practice. Moreover, the disposition of the said pulleys will vary with the angle at which the apparatus is set to work. I therefore prefer to construct the said pulleys as shown in Figs. 1 and 2, whereby the pulley is mounted on a pivot provided with a plug or dovetail $z$, which fits into a corresponding longitudinal socket or recess $z'$, attached to the framework of head-gear B. The said plugs or dovetails may be secured to the socket Z' wherever desired or considered convenient, so that the pulleys may be readily placed in almost any position with the least possible delay.

Having now described my invention, what I claim as new, and desire to secure by Letters Patent, is—

1. An improved conveyer consisting of a car adapted to run upon a wire ropeway stretched between two head-gears or towers the one head-gear or tower being fixed and provided with a turn-table at its top and the other head-gear or tower mounted on trolleys running on rails radially laid, the top of each head-gear to which either end of the said wire rope is stretched being secured by anchor-ropes affixed to traveling anchorages so that the conveyer may be turned so as to work at any angle, substantially as described.

2. An improved conveyer consisting of a car adapted to run upon a wire rope A which is secured at either end by means of pins C C' to movable frames T T' which are free to slide longitudinally on runners $d'$ $d^6$, the runners $d'$ forming the top of a turn-table D supported on rollers F F at the top of fixed head-gear B, the runners $d^6$ secured to the top of the outer head-gear B', which is mounted on trolleys $Z^6$ running on rails $Z^8$ radially laid, the anchor-ropes G G' secured to the frames T T', the outer ends of which ropes G G' are secured to a traveling anchorage (such as V U) so as to take the longitudinal strains of the rope A and allow the main ropeway A to be swung around so as to discharge over a large area substantially as hereinbefore described.

3. In combination with a conveyer-car (such as H) and a detachable bucket (such as H'), a locking device consisting of a movable forked bolt (such as K) pivoted to the body of the car and adapted to receive within its forked end studs $h$ $h$ formed on the framework which carries the bucket said locking-bolt K being retained in position by a second locking-bolt (such as L) and tension-spring $l^2$ which prevents the forked bolt K dropping by reason of the weight of the bucket attachment which it continues to bear until the said second retaining-bolt L is knocked out of position by engaging a projection or catch $l^3$ clamped to the main ropeway, substantially as hereinbefore described and illustrated in Figs. 1, 4 and 5 of the accompanying drawings.

4. In combination, the elevated way and conveyer-car, the detachable bucket and a locking device therefor comprising a forked bolt pivoted to the body of the car, studs on the framework of the bucket adapted to engage said fork, a locking-bolt L adapted to engage said forked bolt to hold the same with the bucket suspended therefrom, a spring $l^2$ exerting tension on said locking-bolt, and a stop on the way adapted to move said locking-bolt against the tension of the spring, substantially as described.

5. In combination with the elevated way and conveyer car and bucket running thereon, an independent car Q on said way, a clamp carried by said independent car, cams for operating said clamp, ropes connected with said cams, a projecting arm carried by said independent car and a retaining-catch carried by the bucket adapted to be released by said arm, substantially as described.

6. In a device of the character described, a traveling anchorage for stay-ropes, comprising parallel girders or runners, columns supporting the same and a block on said runners adapted to have the end of the stay-rope secured thereto, substantially as described.

In witness whereof I have hereunto set my hand in presence of two witnesses.

ALEXANDER DUNCAN JANSEN.

Witnesses:
 ADILIE C. GLEASON,
 LOUISE J. BOAZ.